(12) United States Patent
Cao

(10) Patent No.: US 10,241,874 B2
(45) Date of Patent: Mar. 26, 2019

(54) CHECKPOINT METHOD FOR A HIGHLY AVAILABLE COMPUTER SYSTEM

(71) Applicant: Lei Cao, Westford, MA (US)

(72) Inventor: Lei Cao, Westford, MA (US)

(73) Assignee: Stratus Technologies, Maynard, MA (US)

( * ) Notice: Subject to any disclaimer, the term of this patent is extended or adjusted under 35 U.S.C. 154(b) by 65 days.

(21) Appl. No.: 15/597,920

(22) Filed: May 17, 2017

(65) Prior Publication Data

US 2018/0336106 A1    Nov. 22, 2018

(51) Int. Cl.
*G06F 11/00* (2006.01)
*G06F 11/14* (2006.01)
*G06F 3/06* (2006.01)
*G06F 9/455* (2018.01)

(52) U.S. Cl.
CPC ........ *G06F 11/1471* (2013.01); *G06F 3/0604* (2013.01); *G06F 3/0631* (2013.01); *G06F 3/0683* (2013.01); *G06F 9/45558* (2013.01); *G06F 2009/45583* (2013.01); *G06F 2201/805* (2013.01); *G06F 2201/815* (2013.01); *G06F 2201/82* (2013.01)

(58) Field of Classification Search
USPC .......................................................... 714/19
See application file for complete search history.

(56) References Cited

U.S. PATENT DOCUMENTS

| | | | |
|---|---|---|---|
| 2002/0132613 A1* | 9/2002 | Leung | H03M 7/3088 455/414.1 |
| 2005/0027961 A1* | 2/2005 | Zhang | G06F 12/1027 711/207 |
| 2014/0164591 A1* | 6/2014 | Bickford | G06F 9/45558 709/224 |
| 2015/0268979 A1* | 9/2015 | Komarov | G06F 9/45533 711/145 |

* cited by examiner

*Primary Examiner* — Sarai E Butler
(74) *Attorney, Agent, or Firm* — Robert Schuler

(57) ABSTRACT

A HA computer system is configured to support the operation of an active and a standby virtual machine, and the active virtual machine supports one or more first computer processes and the standby virtual machines supports duplicates of the one or more first computer processes. Each active virtual machine monitors and stores a state of the first computer processes and periodically pauses to only synchronize some of the state of the first computer processes running on the active VM with state associated with the duplicate processes running on the standby VM stored in a first region of virtual memory.

17 Claims, 5 Drawing Sheets

CHECKPOINT METHOD FOR A HIGHLY AVAILABLE COMPUTER SYSTEM

1. FIELD OF THE INVENTION

The invention relates generally to the field of highly available computing and more specifically to synchronizing the operating state between an active and a standby virtual machine in such a system.

2. BACKGROUND

There are a variety of ways to provide highly available (HA) computer processes or applications. Specifically, hardware and software techniques can be used either alone or in some combination to provide such processes. As an example, it is possible to connect two (or more) physical computers, such that one computer actively runs processes while the other computer (or computers) maintains operational state of the processes in an idle or in a standby mode, and is ready to transition to an active mode in the event that some function or process operating on the active host computer undergoes some a failure. In such HA computer systems, some portion or all of the information about the state of the active computer must be periodically saved to the standby computer so that the standby computer is able take over responsibility for running the processes from the point that the active computer experiences a failure. This example can be extended to the current practice of using a virtualized computing environment to run processes.

Virtualization is used in many areas to reduce the number of physical resources needed to perform particular functionality. In this regard, a single, physical host computer system can be designed to operate as though multiple different computers are operating on different processes as the same time. This is typically accomplished by operating multiple virtual computers or virtual machines (VM) as guests within the physical host computer. Each virtual machine can run under the control of its own virtual machine monitor (i.e., hypervisor) executing in memory on the host computer. Each virtual machine can execute one or more processes or applications, and access physical data storage and computer networks as required by the applications. In addition, each virtual machine may in turn act as the host computer system for another virtual machine.

Multiple virtual machines may be configured as a group to execute one or more of the same processes. Typically, one virtual machine in the group is the primary, or active virtual machine, and the remaining virtual machines are the secondary or standby virtual machines. If something goes wrong with the active virtual machine, one of the standby virtual machines can transition to become active, and take over and assume the formerly active virtual machine's role in the computing system. This redundancy allows the group of virtual machines to operate as a HA computing system. The primary virtual machine executes processes/applications, receives and sends network data, and reads and writes to data storage while performing automated or user initiated tasks or interactions. The standby virtual machine(s) have the same capabilities as the active virtual machine, but do not take over the relevant tasks and activities until the active virtual machine fails or is affected by an error.

For such a collection of virtual machines to function in a highly available computer system, the operating state, memory and data storage contents of a standby virtual machine should be equivalent to the operating state, memory and data storage contents of the active virtual machine. If this condition is met, the standby virtual machine may take over for the active virtual machine without the loss of any data. To assure that the state of the standby machine and its memory is equivalent to the state of the active machine and its memory, it is necessary for the active virtual machine to periodically transfer its state and memory contents to the standby virtual machine.

The periodic exchange of state to maintain synchrony between the virtual machines is termed checkpointing. A checkpoint cycle comprises the steps of identifying, acquiring, transferring, acknowledging, and committing. These cycles repeat with each checkpoint operation, defining a potential starting point for the standby virtual machine in the event of a failure of the active virtual machine.

In the event of an active VM failure, the standby VM is 'rolled back' to the most recently committed checkpoint and all pending (buffered) network egress frames from the failed active VM are discarded. This allows the standby VM to safely roll back and restart its processing without creating conflicting results to network clients. Any new network egress traffic is again buffered until the next checkpoint cycle 'commit' allows them to be released.

3. BRIEF DESCRIPTION OF THE DRAWINGS

4. DETAILED DESCRIPTION

Figure 1:
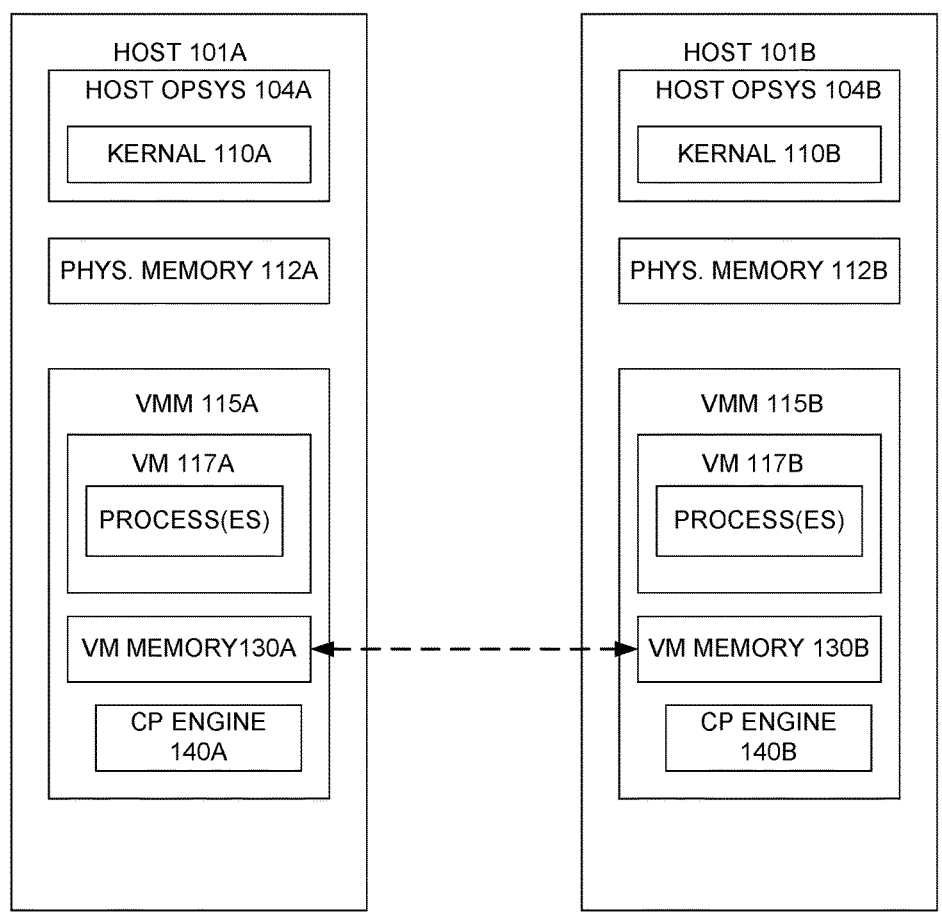
FIG. 1 is a diagram illustrating functional blocks comprising a HA computer system 100.

On certain operating systems, such the Linux operating system, virtual machine (VM) memory pages are typically managed such that they are backed by physical pages of the same size. In this case, and depending upon the system processor, all processes running on the VM can be allocated 4 KB or 8 KB pages (depending upon the system processor), regardless of whether they would run more efficiently with larger pages. On the other hand, the efficiency with which some processes run can benefit from a larger page size (i.e., huge pages which can be 2 MB or larger). More specifically, certain virtualized network applications or processes can achieve better performance when they are allocated much larger, or so called huge pages. One such type of application is a virtual network function (VNF) which can have a high rate of memory modification due to a large volume of network packets being received and modified. The operation of a VNF can be optimized by placing network packet memory buffers in very large or huge pages. While configuring VM memory with huge pages can allow certain processes running on the VM to perform more efficiently (i.e., run faster) by reducing translation lookaside buffer (TLB) misses, a VM only backed by huge pages does is not recommended for highly available computer systems that periodically perform a checkpoint operation.

As described earlier, highly available computer systems can employ two physical machines configured so that one copy of a VM runs on one physical machine in the active state, and a related copy of the VM runs on the other physical machine in a standby state, and the entire state of the active VM (i.e., virtual device state(s) and process/application memory) is being continually monitored. During a checkpoint procedure, the operation of the active VM is paused in order to synchronize its current state with that of the standby VM. The amount of time that the active VM is paused during a checkpoint operation is directly proportional to the size of the state that is transferred to the standby VM. If the active VM is backed by huge pages, a single byte of change in memory will cause the entire page of 2 MB or 1 GB to be transferred (or compared against a cached copy to locate the changes) resulting in an overall performance degradation of the VM (and therefore the processes) running on the computer system.

In order to overcome this performance degradation, I have implemented a checkpoint operation in a highly available computer system that operates to only partially synchronize the state of an active VM with the state of a corresponding standby VM. More specifically, I have designed a highly available computer system that operates to identify two virtual memory regions having a first virtual memory region that is backed with physical memory pages of a first size (i.e., 4 KB or 8 KB), and a second virtual memory region that is backed by physical memory pages of a second, larger size (i.e., 2 MB or 1 GB). During a checkpoint procedure, only the state associated with processes running on the active VM which is stored in first virtual memory region is synchronized with state of a corresponding process stored on an associated standby VM. Further, none of the state associated with a process running on the active VM which is stored in the second virtual memory region is synchronized with the state of a corresponding process stored in the standby VM. Performing a checkpoint operation in this manner eliminates the degradation that otherwise would be experienced by synchronizing all of the active VM state with the standby VM state. Considered from another perspective, and depending upon the number of processes running in an active VM that are allocated memory in the second region, more or less time is saved by not synchronizing the active VM state stored in the second region backed by the larger size pages.

More specifically, and according to one embodiment, an operating system kernel running on the highly available computer system is configured so that support for the second, larger size pages is enabled. A virtual memory manager (VMM) is configured to recognize a virtual memory range (second VM region) that is specified to be backed by the second, larger sized pages. During operation, a computer process running on the virtual machine can request that the VMM allocate virtual memory backed by either the first or second page size, and then during a checkpoint operation, only the state of the VM running on the active host and stored in the first memory region is synchronized with standby VM state.

In the case of the Linux operating system, the VMM allocates VM memory to a process requesting the second, larger size pages, by making madvise( ) calls to the Linux kernel with advice set to MADV_HUGEPAGE, and the VMM/hypervisor makes madvise( ) calls with advice set to MADV_NOHUGEPAGE in order to allocate the first size page. The hypervisor also notifies the kernel of the memory range that is backed by huge pages so that kernel would not track the dirtiness of the pages within that range.

FIG. 1 illustrates the general architecture of a highly available (HA) computer system 100 that is comprised of first and second hosts, Host 101A and Host 101B respectively. Host 101A is configured to support the operation of one or more active virtual machines, VM 117A, and Host 101B is configured to support the operation of one or more corresponding standby virtual machines, VM 117B. More specifically, the Host 101A has an operating system 104A with kernel 110A, physical memory 112A, a virtual machine manager (VMM) or hypervisor 115A that manages the operation of the VM117A, a virtual machine memory 130A and a checkpoint engine 140A. The Host 101B has functionality that corresponds to that comprising the Host 101A.

In the case of the HA computer system 100, the host operating system 104A can be the Linux operation system and the kernel 110A generally operates to manage access to physical memory by the applications running on the virtual machines. While the embodiment described herein refers to the Linux operating system, any operating system that can be configured to support two or more different memory page sizes is suitable. In the case of the Linux operating system, the kernel can be enabled to support transparent huge pages, and the VMM can be configured to recognize a specified range in physical memory that is backed by the huge pages. The huge pages can be specified to be of any size that is supported by the operating system, and in the case of Linux, the huge page size can range from 2 MB to 1 GB, for example. The VM 117A can be configured to support one or more applications or processes which are rendered to be highly available as a consequence of the system 100 being configured to support the operation of the active and the standby hosts. Depending upon the memory requirements of each process running on the VM 117A, the VMM 115A can allocate one or more VM memory pages of a first or second size for the operation of each process.

Continuing to refer to FIG. 1, the CP engine 140A operates to periodically pause the virtual machines, VM 117A, in order to synchronize the state of processes running on the VM 117A with the state of duplicate processes maintained in the VM 115B on Host 101B. A detailed description of the operation of the CP engine is undertaken later with reference to FIG. 3, but as described earlier, the CP engine is configured to only synchronize the state of processes that are allocated virtual memory pages of the first size, which in the case of Linux is non-huge pages. Synchronizing state between the VM 117A and 117B in this manner minimizes the time spent during the checkpoint process which results in operational efficiencies with respect to the processes running on the virtual machines.

Figure 2:
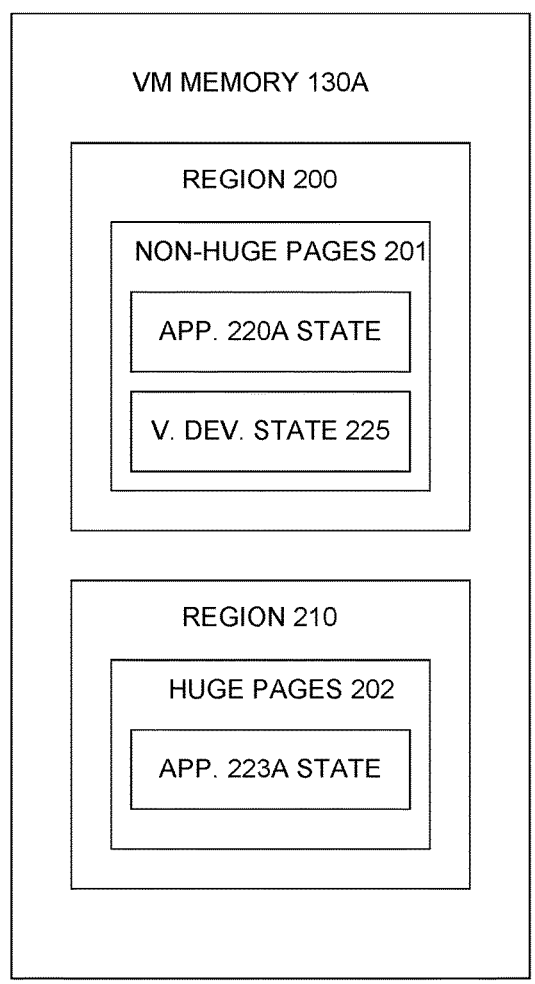
FIG. 2 is a diagram illustrating two virtual memory regions.

FIG. 2 is a diagram showing the VM memory 130A of FIG. 1 having a first virtual memory region 200 backed by physical memory pages of a first size, and a second virtual memory region 210 back by physical memory pages of a second, larger page size. Alternatively, more than two memory regions each being backed by physical memory pages of different sizes can also be implemented. The virtual memory region 200 is backed by, in the case of a Linux system, non-huge pages 201, and the virtual memory region 210 is backed by huge pages 202. During the time that the VM 117A is active and not paused, one or more of the processes or applications running on the VM can request to be allocated one or more non-huge pages 201 by the VMM 115A, and state 220A (data stored as a consequence of logical instructions associated with the process being executed by the HA computer system) resulting from and associated with the operation of the application can be stored in any of these pages. Also, virtual devices operating under the control of the VMM 115A to support any of the applications running on the VM 117A can also be allocated non-huge pages in order to store information (state 223A) needed by the applications to operate. The combination of the application state 220A and virtual device state 225 and the application state 223A comprises all of the state associated with the VM 117A running on the Host 101A. As previously described, only VM state associated with processes or virtual devices maintained in non-huge pages of virtual memory is subject to a checkpoint operation. A checkpoint operation that can be employed to synchronize the VM 117A state with the VM 117B state is now described with reference to FIG. 3.

Figure 3:
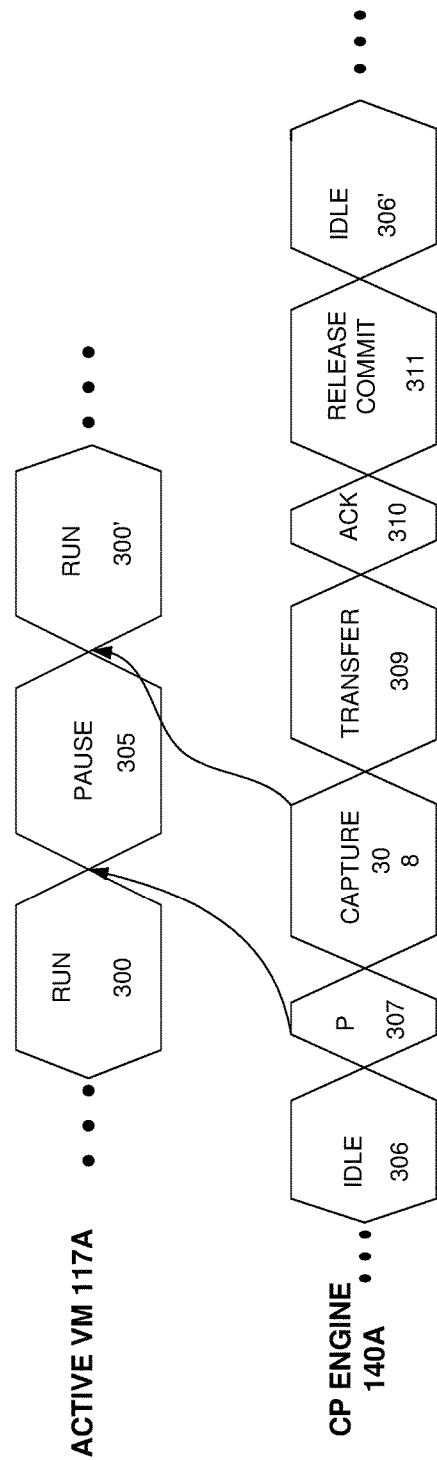
FIG. 3 is a diagram illustrating a checkpoint process and its effect on an active virtual machine.

Generally, the methodology employed to perform a CP operation is well known, and the CP operation illustrated in FIG. 3 and described herein can be similar with the exception that the CP engine 140A is configured to only transfer state associated with processes running on the active VM 117A that are allocated non-huge pages and which is maintained in the first virtual memory region. Specifically, FIG. 3 represents a timing diagram of events controlled by the CP engine 140A to synchronize the active VM 117A state with the standby VM 117B state. The active VM 117a is either running (executing an application) at 300 or 300', or it can be paused at 305. The checkpoint engine may be idle at 306 until a checkpoint pause (P) occurs at 307, at which time the CP engine controls the active VM to pause at 305. While the active VM is paused, the state of the active VM (operational state maintained in the first virtual memory region) is captured by the checkpoint engine at 308. Capture is a page-copying stage that allows the virtual machine to be resumed and executed in parallel with checkpoint 'transfer' at 309 and 'ACK' 310. Subsequent to the state data being captured at 308, the CP engine controls the active VM 117A at 300' to resume running and again executing one or more processes or applications. As mentioned earlier, the captured VM state data is transferred at 309 to the standby VM 117B. Once the data has been transferred, the CP engine waits at 310 for an acknowledgement (ACK) to be received from the standby VM 117B, indicating that the data has been received. At 311, the checkpoint cycle is committed and any buffered network data is released to the network. At this point the CP engine enters an idle state 306' until the next checkpoint time occurs.

Figure 4A:
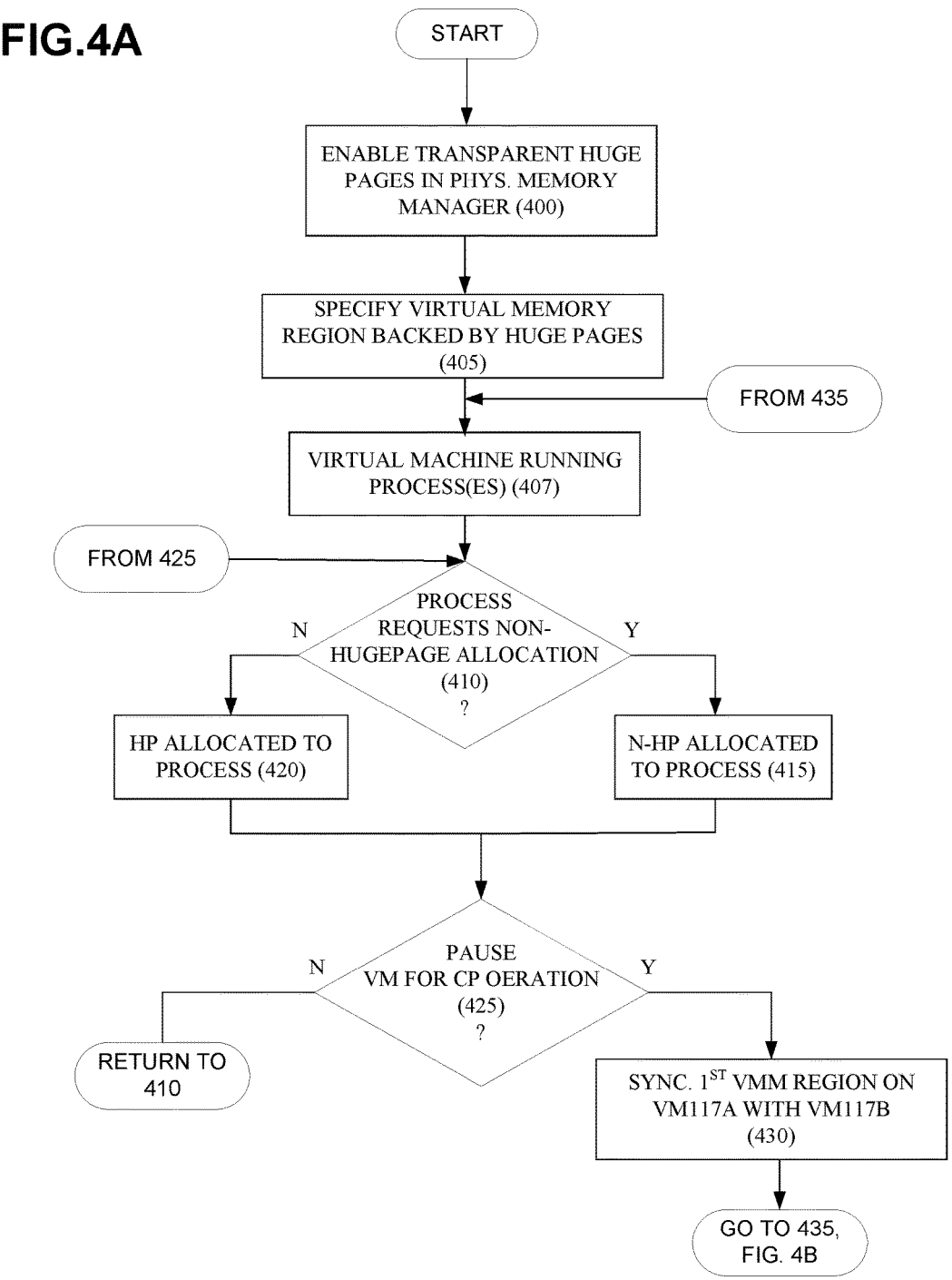
FIGS. 4A and 4B illustrate a methodology for configuring and running a checkpoint operation.
Figure 4B:
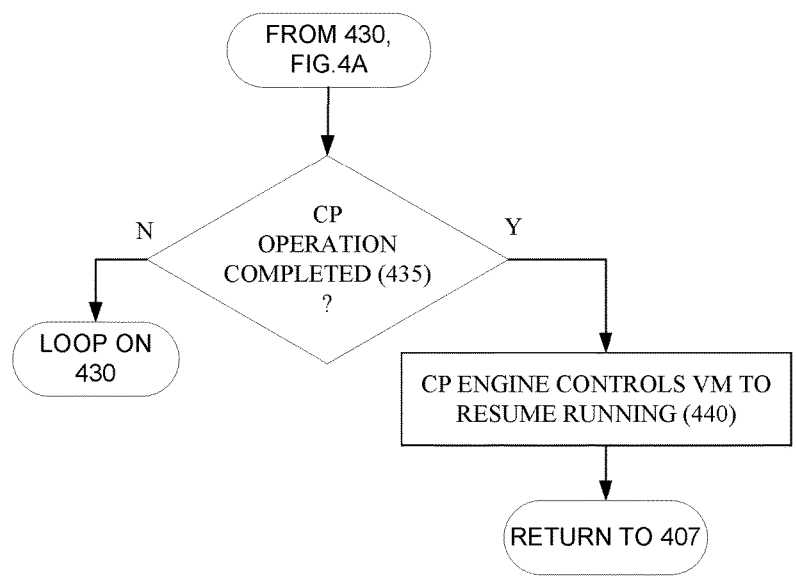

The methodology by which the HA computer system is configured and operates to support the checkpoint procedure is now described with reference to FIG. 4. At 400 a system administrator or user configures the operating system kernel to support the second, larger memory page size (i.e., transparent huge pages), and at 405 specifies the address range in virtual memory that is backed by huge pages. Specifically, at 405 the user configures the VMM 115A to identify the address range dedicated to a first page size (i.e., non-huge pages) and to a second, larger page size (i.e., huge pages) as the first and the second virtual memory regions respectively. At 407, one or more a processes or computer applications are initialized on the active VM 117A prior to a checkpoint operation. At 410, a process requests one or more pages of virtual memory, and if the request is for one or more pages of the first size, then the process proceeds to 415 and the VMM allocates one or more pages of the first size (non-huge pages), otherwise the process proceeds to 420 and the VMM allocates one or more pages of the second, larger size. The allocation of virtual memory by the VMM continues until the CP engine 140A controls the process running in 410 to be paused, and at 430 initiates a CP procedure. As described earlier with reference to FIG. 3, the CP engine 140A is configured to only capture the VM 117A state stored in association with the first VM region 200, and then cause this state to be copied to the standby VM, VM 117B. Then in FIG. 4B, at 435, when the CP operation is complete, the CP engine at 440 controls the VM 117A to resume running, and the process returns to 407.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of performing a checkpoint operation, comprising:
    configuring a first virtual machine running on an active host computer to allocate one or more pages from a first virtual memory region to a first process, and to allocate one or more pages from a second virtual memory region to a second process, the first virtual memory region being backed by physical memory pages of a first size that is smaller than physical memory pages of a second size backing the second virtual memory region; and
    controlling the operation of the first virtual machine to synchronize only those physical memory pages allocated to the first process with physical memory pages allocated to a duplicate process maintained in association with a second virtual machine running on a standby host computer.

2. The method of claim 1, wherein an operating state of the second process is not synchronized during the checkpoint operation with a duplicate process running on the standby host computer.

3. The method of claim 1, wherein the first virtual machine is configured to identify the first and second virtual machine memory regions.

4. The method of claim 1, wherein an operating system running on the active host computer is configured to reserve physical pages of the second, larger size to back the second virtual memory region.

5. The method of claim 4, wherein a virtual machine manager controls the operating system running on the active host computer to reserve physical memory pages of the first size when the first process requests virtual memory space, and to reserve physical memory pages of the second size when the second process requests virtual memory space.

6. The method of claim 1, wherein the checkpoint operation controls the first virtual machine to be paused during a time that it captures the state associated with the first process, and controls the first virtual machine to resume running when all of the state associated with the first process is captured.

7. The method of claim 5, wherein the operating system is Linux.

8. The method of claim 1, wherein the pages of the first size are non-huge pages and the pages of the second, larger size are huge pages.

9. The method of claim 5, wherein the virtual machine manager is configured to control the active host computer operating system to not track access by the second process to the physical memory pages backing the virtual memory pages of the second, larger size comprising the second virtual memory region.

10. A method for partially synchronizing an operating state of a first virtual machine with a second virtual machine;

configuring the first virtual machine running on an active host computer to identify a first and a second virtual memory region, the first virtual memory region being backed by physical memory pages of a first size that are smaller than physical memory pages of a second size backing the second virtual memory region;

allocating one or more pages from the first virtual memory region to a first process running on the first virtual machine, and allocating one or more pages from the second memory region to a second process running on the first virtual machine, and controlling the operation of the first virtual machine to only synchronize those physical memory pages allocated to the first process with physical memory pages allocated to a duplicate process maintained in association with the second virtual machine running on a standby host computer.

11. The method of claim 10, wherein an operating state of the second process is not synchronized during a checkpoint operation with a duplicate process running on the standby host computer.

12. The method of claim 10, wherein the first virtual machine is configured to identify the first and second virtual machine memory regions.

13. The method of claim 10, wherein an operating system running on the active host computer is configured to reserve physical pages of the second, larger size to back the second virtual memory region.

14. The method of claim 13, wherein a virtual machine manager controls the operating system running on the active host computer to reserve physical memory pages of the first size when the first process requests virtual memory space, and to reserve physical memory pages of the second size when the second process requests virtual memory space.

15. The method of claim 10, wherein the checkpoint operation controls the first virtual machine to be paused during a time that it captures the state associated with the first process, and controls the first virtual machine to resume running when all of the state associated with the first process is captured.

16. A highly available computer system, comprising:

an active host computer configured to support the operation and maintaining state of a first virtual machine on which is running a plurality of processes under control of a virtual machine manager;

a standby host computer supporting the operation of a second virtual machine that maintains state associated with a plurality of processes that are duplicates of the processes running on the active host computer;

a checkpoint engine that is configured to only synchronize a portion of the state of the first virtual machine with the state of the second virtual machine;

wherein, the operational state associated with a first one of the plurality of the processes running on first virtual machine is maintained in a first region of virtual memory, the operational state of a second one of the processes running on first virtual machine is maintained in a second region of the virtual memory, and the first virtual memory region is backed by physical memory pages of a fist size that are smaller in size than physical pages of a second size backing the second virtual memory region; and the portion of the virtual machine state that is synchronized is one or more physical pages maintained in the first region of virtual memory.

17. The system of claim 16, wherein the operating state of the second one of the processes is not synchronized during a checkpoint operation with a duplicate process running on the standby host computer.

* * * * *